United States Patent

Stevenson et al.

[11] Patent Number: 5,881,994
[45] Date of Patent: Mar. 16, 1999

[54] VARIABLE TEMPERATURE CONTROL SYSTEM FOR VEHICLES

[75] Inventors: Jordan M. Stevenson, Walled Lake; Bipin D. Parekh, Plymouth; Dennis Shifflett, Macomb; Fred W. Butler, Oxford, all of Mich.

[73] Assignees: TRW Inc., Cleveland, Ohio; Ford Motor Company, Dearborn, Mich.

[21] Appl. No.: 661,936

[22] Filed: Jun. 11, 1996

[51] Int. Cl.[6] .............................. F16K 31/53; F16K 31/46
[52] U.S. Cl. ........................................ 251/250.5; 251/294
[58] Field of Search ................................ 251/294, 250.5; 74/89.2; 454/159, 160

[56] References Cited

U.S. PATENT DOCUMENTS

| | | | |
|---|---|---|---|
| 1,501,340 | 7/1924 | Hirschler | 251/250.5 |
| 2,220,431 | 11/1940 | Strehs | 251/250.5 X |
| 2,583,050 | 1/1952 | Harrower | 251/250.5 |
| 3,823,617 | 7/1974 | Infanger et al. | |
| 4,509,387 | 4/1985 | Tschanz et al. | 251/294 X |
| 4,535,932 | 8/1985 | Herb | 251/294 X |
| 4,656,926 | 4/1987 | Bauer | 251/294 X |
| 5,235,866 | 8/1993 | Truman et al. | 74/89.22 |

FOREIGN PATENT DOCUMENTS 2357951  2/1978  European Pat. Off. .

*Primary Examiner*—John Rivell
*Attorney, Agent, or Firm*—Fay, Sharpe, Beall, Fagan, Minnich & McKee

[57] ABSTRACT

A rotary temperature control system for use in controlling the temperature of a blended air stream supplied to a vehicle passenger compartment includes a manually operable rotary control knob operatively connected with a control pulley that is, in turn, connected through a pull-pull cable system to a vent pulley. The vent pulley operates a blend door that controls the output temperature of a blended air stream. A drive connection between the vent pulley and a drive shaft of the blend door includes non-circular gears for producing a predetermined generally non-linear relationship between rotary movement of the control pulley and rotary movement of the output shaft to produce a generally linear relationship between the rotary movement of the control pulley and the temperature of the air stream throughout a major portion of the rotary movement of the control pulley.

23 Claims, 4 Drawing Sheets

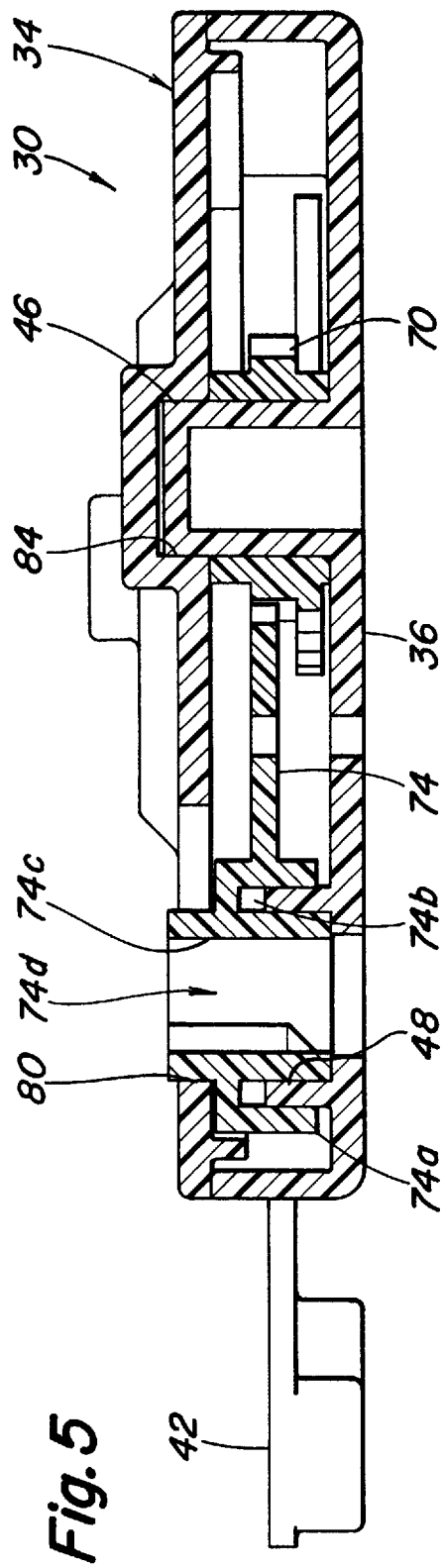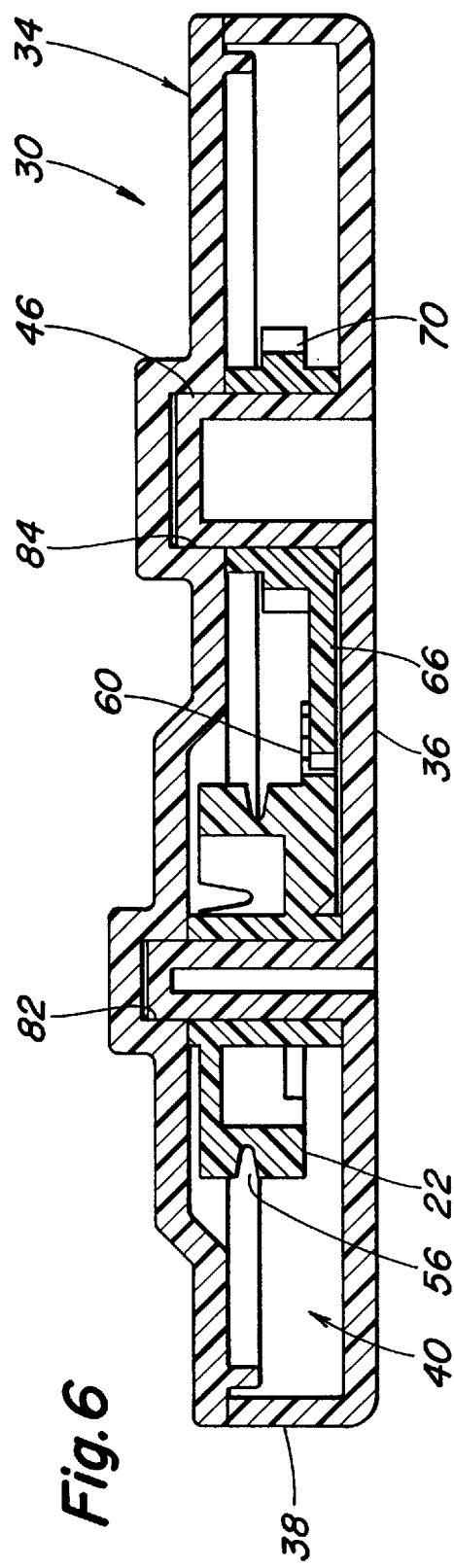

VARIABLE TEMPERATURE CONTROL SYSTEM FOR VEHICLES

BACKGROUND OF THE INVENTION

The subject invention is directed to a temperature control system for vehicles and, more particularly, to a variable temperature control system for controlling the temperature of air supplied to a vehicle's passenger compartment.

In the typical vehicle heating and air conditioning system, temperature controlling is accomplished by controlling the setting of a vent damper or blend door located in the passenger air supply system duct work. Often a rotary knob located at the control panel is drivingly connected to the blend door through a mechanical cable or linkage arrangement. The loads required to operate the blend door have generally required relatively rigid control cables and linkages.

Various proposals to simplify or improve the drive connection between the operating knob and the blend door have been presented. However, problems with respect to high operating knob force requirements and the routing the drive connection between the knob and blend door have persisted. In addition, readjustment of control cable length after installation has also been a problem.

A further drawback to prior systems has been the difficulty of achieving a linear relationship between knob movement and output air temperature. Generally, this has only been achievable through the use of electronic systems or by a mechanical system of cams and rigid push-pull cables. The electronic systems are costly, and the systems incorporating rigid push-pull cables present difficult routing problems and substantially limit the use of the systems.

SUMMARY OF THE INVENTION

The subject invention provides an improvement to a control system of the type described which produces a near linear relationship between control knob rotation and output air temperature. In addition, the invention results in significant reduction in operating knob force to allow use of thin, light pull-pull operating cables. This allows easy routing of the operating cables. Moreover, the invention allows significant reduction in cost as compared to electrical operating systems.

In accordance with the subject invention, there is provided a rotary temperature control system that includes a manually operable rotary control knob that is operatively connected with a control pulley for producing selective rotation thereof. A flexible cable means extends from the control pulley to a vent pulley for producing rotary movement of the vent pulley in response to rotary movement of the control pulley. A rotary output shaft is provided for driving a blend door that controls the temperature of a blended output air stream. The vent pulley and the rotary output shaft are connected by drive means that include non-circular shaped gears providing a drive connection between the vent pulley and the output shaft for producing a predetermined, generally non-linear relationship between rotary movement of the control pulley and rotary movement of the output shaft to produce a generally linear relationship between the rotary movement of the control pulley and the temperature of the air stream throughout a major portion of the rotary movement of the control pulley.

In accordance with a further aspect of the invention, the drive means further includes a sector gear rotated by the vent pulley. Preferably, the vent pulley and one of the first and second non-circular gears are mounted for rotation about a common axis.

In its preferred form, the drive means includes a housing assembly which houses the vent pulley and the first and second non-circular gears. In addition, the output shaft extends into the housing and is rotatable about an axis parallel to the axes of rotation of the non-circular gears.

The use of the described drive arrangement allows the non-circular shaped gears to be designed so as to provide the necessary non-linear movement of the output shaft in response to linear movement of the manually operable rotary control knob. This, in turn, allows a linear relationship between the rotary movement of the manually operable rotary control knob and/or the control pulley relative to the temperature of the air stream. Although it is preferred that this relationship be substantially linear throughout the major portion of the rotary movement of the control pulley, it is possible to modify it slightly to assure that the forces required for knob movement do not become undesirably high or excessive at any point in the control range.

In its preferred form, the drive means, including the housing, as well as the vent pulley and the non-circular gears, are formed of plastic and constitute a relatively small, lightweight assembly that can be directly associated with the blend door mounting or drive shaft.

In view of the above, it is a primary object of the invention to provide a manually operable, mechanically interconnected temperature control system wherein a linear rotary input results in a non-linear rotary output so that the resulting temperature of a blended air stream can have a linear relationship to the linear input.

A further object of the invention is the provision of a rotary temperature control system of the general type described which is highly compact and relatively inexpensive to construct.

Yet another object of the invention is the provision of a temperature control system that is simple to install and which allows the drive interconnection between the control knob and the blend door to have substantially any desired routing.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, a preferred embodiment of which will be described in detail in this specification and illustrated in the accompanying drawings which form a part hereof, and wherein.

DETAILED DESCRIPTION OF THE PREFERRED EMBODIMENT

Figure 1:
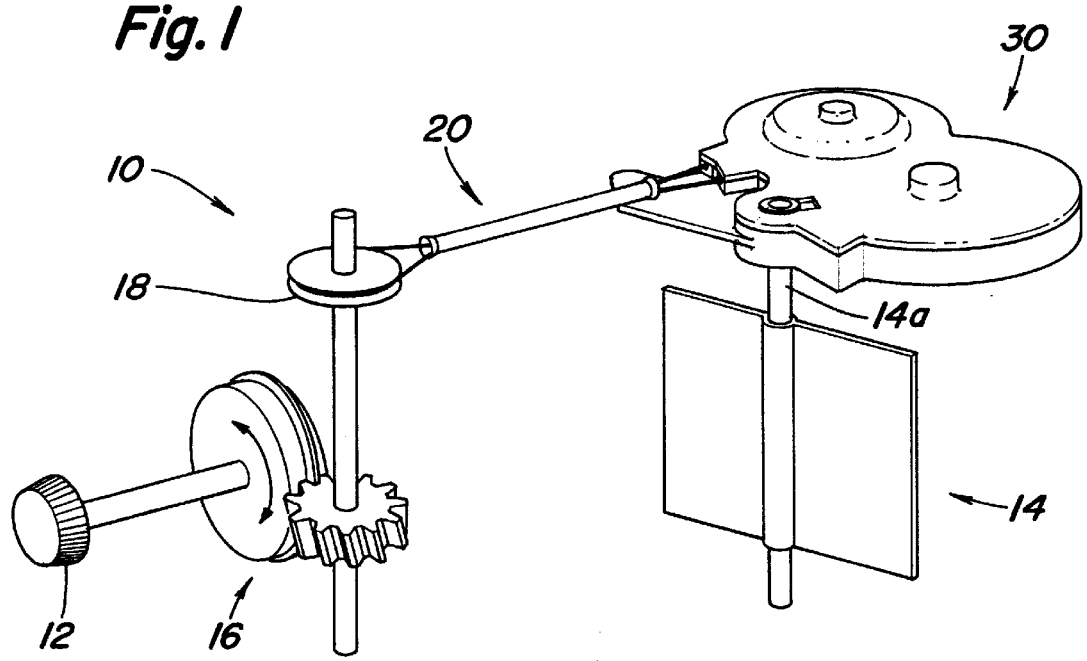
FIG. 1 is a somewhat diagrammatic pictorial view showing the overall arrangement of a variable temperature control system formed in accordance with a preferred embodiment of the subject invention.

Referring now to the drawings wherein the showings are for the purposes of illustrating the preferred embodiment of the invention only and not for purposes of limiting same, FIG. 1 shows the overall arrangement of a temperature control system 10 for controlling the temperature of air supplied to the passenger compartment of a motor vehicle. In the system illustrated, a rotary, manually operable control knob 12 is mechanically, drivingly interconnected with a vent damper or blend door 14 that acts to selectively blend or mix outside air and temperature modified air to produce a desired output stream that is connected to the vehicle passenger compartment. In the subject embodiment, the control knob 12 is connected through a worm and spur gear assembly 16 with an input or control pulley 18 of a pull-pull cable drive system 20. The output of the pull-pull cable system comprises and output or vent pulley 22 (see FIG. 3) that is mounted in a suitable housing 34 that forms part of a drive means and gear system 30 that will subsequently be discussed and described in detail.

The particular form of interconnection between the rotary input knob 12 and the control pulley 18 could be of a variety of different types and the worm and spur gear combination shown is merely for illustration purposes. Likewise, with respect to the pull-pull cable system 20, this could also be a variety of specific, well known constructions, for example, it could be generally as shown in U.S. Pat. No. 5,235,866 of Aug. 17, 1993 "Rotary Temperature Control Device" and assigned to one of the assignees of the subject application.

Figure 2:
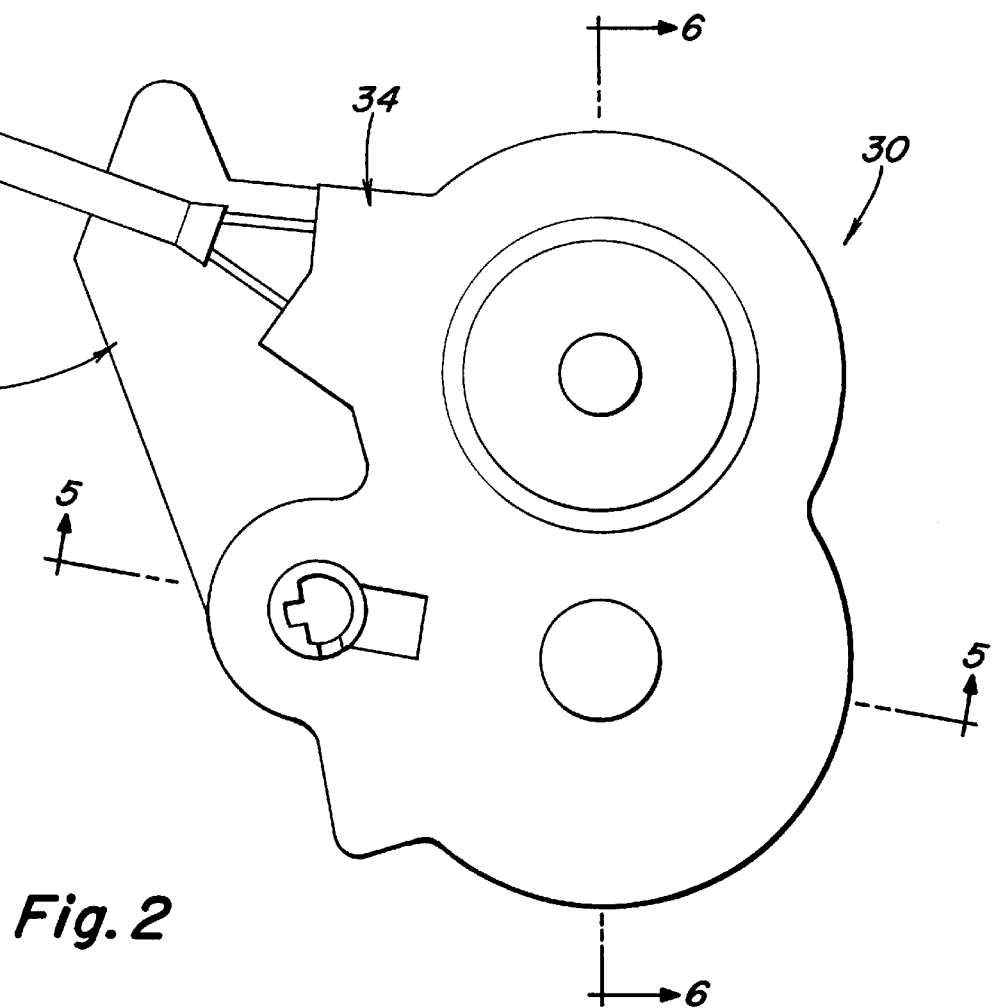
FIG. 2 is a top plan view of the inventive drive assembly portion of the FIG. 1 showing.

The drive means and gear system 30 which provides the drive connection between the pull-pull cable drive system 20 and the output shaft 14a which operates the blend door 14 is particularly designed to produce a predetermined, generally non-linear movement relationship between the rotary movement of the control pulley 18 and the rotary movement of the output shaft 14a to produce a generally linear relationship between the rotary movement of the control pulley 18 and the temperature of the blended air stream supplied to the passenger compartment throughout a major portion of the rotary movement of the control pulley. As will subsequently be described in some detail, this is accomplished through the use of variable ratio, non-circular gearing to compensate for the non-linear relationship between the blend door movement and the mix ratio produced between the blend air streams. The preferred form for system 30 can best be understood by reference to FIGS. 2–6. As particularly shown in FIGS. 2 and 3, assembly 30 includes an outer housing that generally comprises a lower housing component 32 and a cover or upper housing component 34 that is suitably joined thereto in any convenient manner, such as by mechanical fasteners, welding, or the like. The lower housing component 32 includes a base or bottom wall 36 and an integral, upwardly extending peripheral wall 38 which defines a gear chamber 40. The bottom wall 36 extends laterally beyond the wall 38 in the portion 42 shown to provide a mounting plate and to underlie the cables of pull-pull system 20 that enter into the gear chamber 40 and connect with the vent pulley 22.

The housing components could be formed from a variety of different materials but, in the preferred embodiment, are molded plastic components formed from a relatively high strength plastic such as ABS.

Referring again to the lower housing component 32, it will be noted that three circular posts 44, 46, and 48 extend vertically upward in parallel relationship from the bottom wall 36. The first post 44 is arranged to receive the vent pulley 22 and is generally aligned between the pair of openings 50–52 that provide receiving elements that are adapted to clamp about the outer sheaths of the pull-pull cables. The pull cables are, in turn, received in a suitable guide groove 56 formed in the outer surface of the vent pulley 22. As can be appreciated, the central hub 22a and through opening 22b of the vent pulley are sized and related to the first post to allow free, but smooth rotary movement therebetween.

Figure 3:
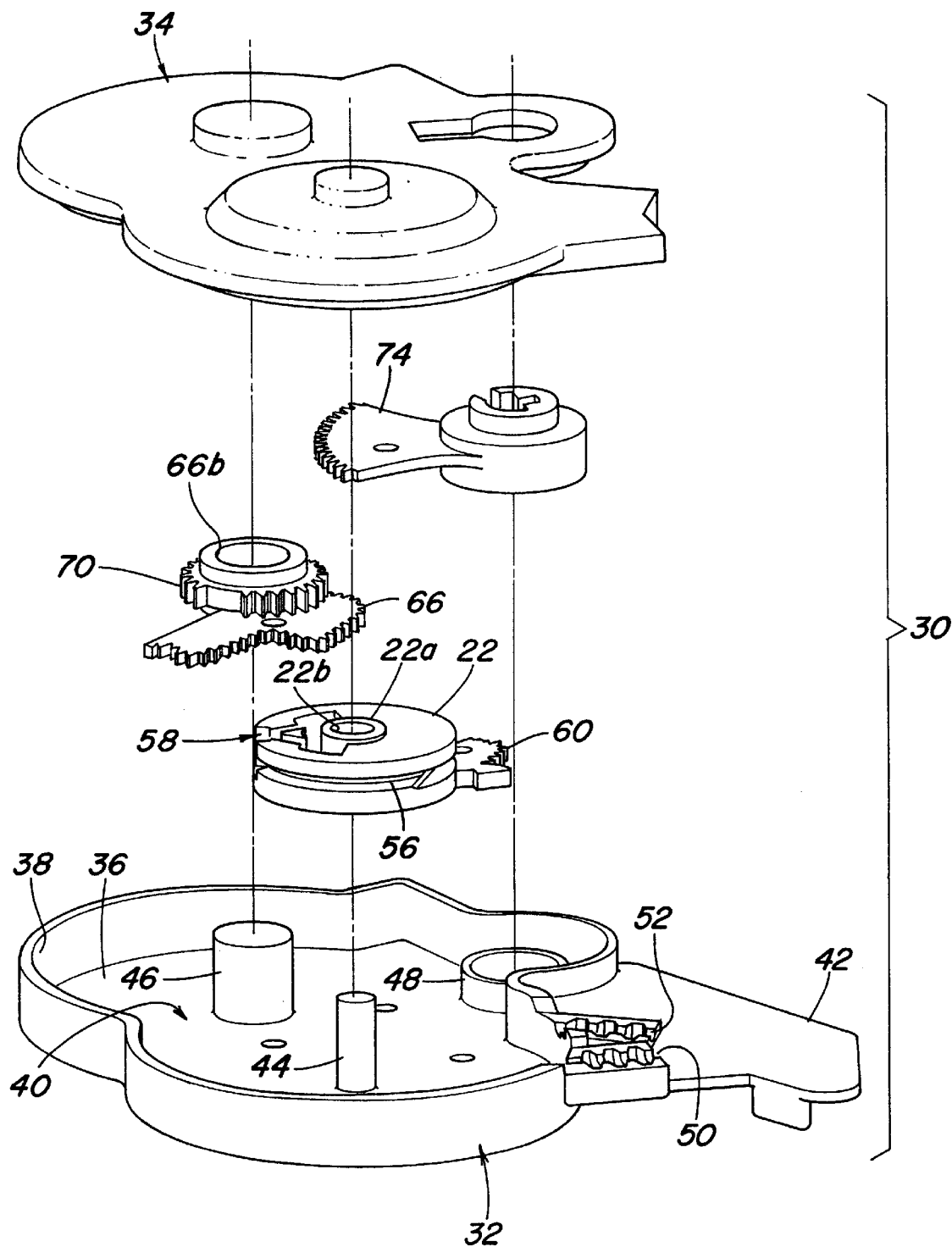
FIG. 3 is an exploded isometric view of the drive assembly of FIG. 2.
Figure 4:
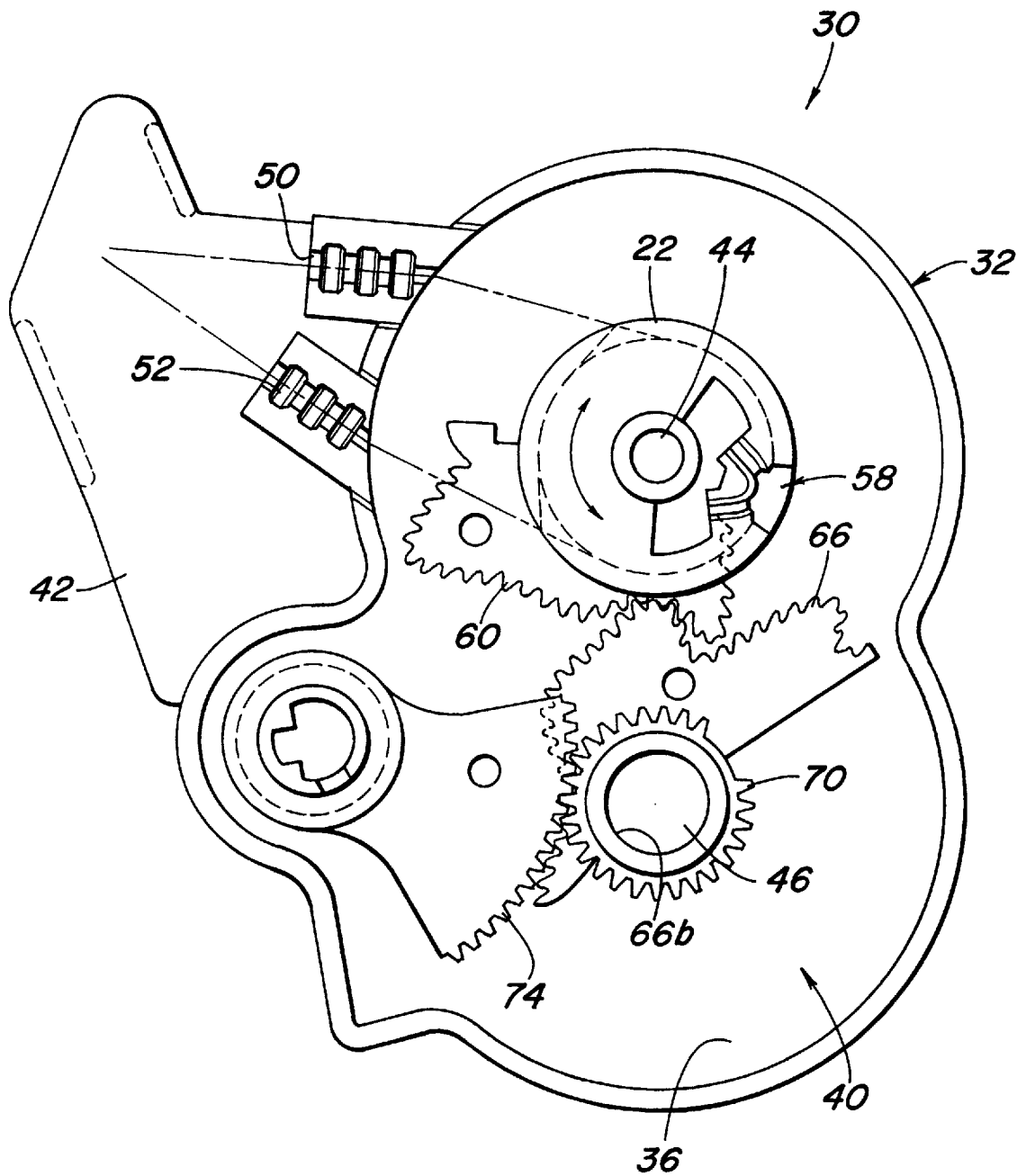
FIG. 4 is a top plan view of the drive assembly with the upper half of the housing removed to clearly show the arrangement of the gears; and, FIGS. 5 and 6 are cross-sectional views taken on lines 5—5 and 6—6 of FIG. 4, respectively.

Driven directly from the vent pulley is a first non-circular gear 60 that is mounted for direct rotation with the vent pulley 22 about the axis defined by post 44. In its preferred form, the first non-circular gear 60 and the vent pulley 22 are molded as a single, unitary element with the non-circular gear 60 positioned beneath the vent pulley 22 as best seen in FIGS. 3 and 6.

It should, of course, be understood that the various gears and pulleys could be formed from a variety of different material but, in the subject embodiment, are preferably molded from a plastic or resinous material such as type PA66 nylon.

Referring again to FIGS. 3 and 4, it will be seen that a second non-circular gear 66 is arranged to cooperate with the first non-circular gear 60 and is arranged and designed so as to have a central through opening 66b for rotation on the second post 46. The second non-circular gear 66 is designed such that it is mounted in horizontal alignment with the first non-circular gear 60. Positioned immediately above and rotatable about the same vertical axis defined by the second post 46 is a circular pinion gear 70 that is drivingly connected directly with the second non-circular gear 66. It is, of course, mounted for rotation about the axis defined by the second post. In the subject embodiment, the non-circular gear 66 and the pinion gear 70 are molded as a single unitary structure.

The pinion gear 70 is, in turn, drivingly engaged with a sector gear 74 mounted for rotation on the third post 48. As best seen in FIG. 5, the sector gear 74 is arranged so as to rest within the third post 48 and is provided with a downwardly extending flange 74a that defines a slot 74b that receives the third post 48. The central sleeve portion 74c of the sector gear 74 extends upwardly through the cover 34 of the housing. It should be noted that the central portion of the sleeve 74c is provided with a through opening 74d and is adapted to drivingly engage through suitable keying with the output shaft 14a that carries the blend door.

Referring more particularly to FIGS. 5 and 6, it will be noted that the cover member 34, in addition to providing the through opening 80 which engages about the upper end of sleeve 74c, is further provided with cylindrical recesses 82, 84 that engage the upper ends of the first and second posts 44, 46 to maintain the various gears and the output pulley 22 in place thereon and to further rigidify the assembly. As previously discussed, the non-circular gears 60, 66 are designed and arranged so as to provide a drive connection between the vent pulley and the output shaft to produce a generally non-linear relationship between rotary movement of the control pulley and rotary movement of the output shaft. This non-linear relationship is selected and designed to desirably provide a generally linear relationship between the rotary movement of the control pulley and the temperature of the resulting blended or mixed air stream throughout a major portion of the rotary movement of the control pulley. The actual relationship can be slightly non-linear throughout various portions of the control range if desired to better control the input forces required in the manual rotary knob. This, of course, varies with each individual system and modification of the gear relationships can modify this facet of the input movement.

The design of the required non-circular shaped gears is basically an empirical process using well known techniques.

In the subject control system, the design parameters are controlled by the characteristics of the heating system to which the control system is applied. The first step of the design process is obtaining a plot of output blended air temperature versus blend door angular position and a plot of blend door torque versus bend door angular position. With that data, it is then possible, using known techniques, to determine the theoretical pitch curve that produces a linear temperature output. Based on the theoretical pitch curve, the theoretical control knob loads can be determined based on the ratios of the non-circular gears. The pitch curve can, of course, be modified to achieve an acceptable compromise between control knob load and temperature curve.

After the desired theoretical pitch curve is developed, the gear teeth for the first gear are created on the curve and the teeth for the second gear are created to match the teeth of the first gear.

As previously mentioned, the actual drive connection between the knob and the pull-pull cable system can vary from that illustrated. In addition, it should be understood that various types of detent mechanisms could be included in this drive to provide a more definite feedback to the operator and improve the overall feel and functioning of the device.

As can be seen from the foregoing discussions, the subject invention allows improved temperature control relationships and allows the input movement to be directly related to the system output temperature.

The invention has been described with reference to the preferred embodiment. obviously, modifications and alterations will occur to others upon a reading and understanding of this specification. It is intended to include all such modifications and alterations insofar as they come within the scope of the appended claims or the equivalents thereof.

Having thus described the invention, it is claimed:

1. A rotary temperature control system comprising:
   a manually operable rotary control knob;
   a control pulley operatively connected with the control knob for selective rotation thereby;
   a vent pulley;
   flexible cable means extending from the control pulley to the vent pulley for producing rotary movement of the vent pulley in response to rotary movement of the control pulley;
   a rotary output shaft for driving a blend door that controls the output temperature of a blended air stream; and,
   drive means including non-circular gears providing a drive connection between the vent pulley and the output shaft for producing a predetermined generally non-linear relationship between rotary movement of the control pulley and rotary movement of the output shafts said non-linear relationship producing a generally linear relationship between the rotary movement of the control pulley and the temperature of the blended air stream throughout a major portion of the rotary movement of the control pulley.

2. The rotary temperature control system of claim 1 wherein the drive means includes a sector gear rotated by the vent pulley.

3. The rotary temperature control system of claim 2 wherein the drive means further includes at least first and second non-circular gears engaged and positioned to transmit rotary movement from the vent pulley to the rotary output shaft.

4. The rotary temperature control system of claim 3 wherein the vent pulley and one of the first and second non-circular gears are mounted for rotation about a common axis.

5. The rotary temperature control system of claim 3 wherein one of the first and second non-circular gears and the vent pulley is mounted for rotation about an axis spaced from the axis of the rotary output shaft.

6. The rotary temperature control system as defined in claim 1 wherein the vent pulley and the drive means including the non-circular gears is mounted in a common housing.

7. The rotary temperature control system as defined in claim 6 wherein there are at least two non-circular gears carried in said housing for rotation about separate first and second parallel axes.

8. The rotary temperature control system as defined in claim 6 wherein said vent pulley is formed integrally with one of the non-circular gears.

9. A rotary temperature control system comprising:
   a manually operable rotary control knob;
   a control pulley operatively connected with the control knob for selective rotation thereby;
   a vent pulley;
   flexible cable means extending from the control pulley to the vent pulley for producing rotary movement of the vent pulley in response to rotary movement of the control pulley;
   a rotary output shaft for driving a blend door that controls the output temperature of a blended air stream; and,
   drive means including non-circular gears providing a drive connection between the vent pulley and the output shaft for producing a predetermined generally non-linear relationship between rotary movement of the control pulley and rotary movement of the output shaft to produce a generally linear relationship between the rotary movement of the control pulley and the temperature of the air stream throughout a manor portion of the rotary movement of the control pulley, the vent pulley and the drive means including the non-circular gears being mounted in a common housing wherein there are at least two non-circular gears carried in said housing for rotation about separate first and second parallel axes, and wherein the output shaft is rotated about a third axis parallel to the first and second parallel axes.

10. The rotary temperature control system as defined in claim 9 wherein the drive means includes cooperating circular gears driving between the output shaft and at least one of the non-circular gears.

11. For use in a rotary temperature control system wherein a vent pulley is drivingly rotated from a manually operable rotary control knob, a drive assembly for connecting the vent pulley to a blend door that controls the output temperature of a blended air stream, said drive assembly comprising:
   a rotary output shaft for connection to the blend door;
   a housing into which the output shaft extends; and,
   drive means in the housing including a first and second interengaged non-circular gears rotatable about spaced first and second parallel axes and providing a drive connection between the vent pulley and the output shaft, the drive means producing a predetermined generally linear relationship between the rotary movement of the control pulley and the temperature of the blended air stream throughout a major portion of the rotary movement of the control pulley.

12. The drive assembly as set forth in claim 11 wherein the vent pulley is mounted in the housing in direct rotary connection with one of the first and second non-circular gears.

13. The drive assembly as set forth in claim 12 wherein the output shaft is rotatable about a third axis parallel to the spaced apart first and second axes of rotation of the non-circular gears.

14. The drive assembly according to claim 11 wherein:
said rotary output shaft is connected to a blend door controlling the output temperature of a blended air stream supplied to a passenger compartment of a vehicle operatively associated with the drive assembly; and,
said drive means produces said linear relationship between the rotary movement of the control pulley and the temperature of said blended air stream supplied to the passenger compartment of the operatively associated vehicle.

15. The rotary temperature control system according to claim 1 wherein:
said rotary output shaft is connected to a blend door that controls the output temperature of a blended air stream supplied to a passenger compartment of a vehicle operatively associated with the rotary temperature control system; and,
said non-linear relationship between the rotary movement of the control pulley and the rotary movement of the output shaft produces a generally linear relationship between the rotary movement of the control pulley and the temperature of said blended air stream supplied to the passenger compartment of the operatively associated vehicle.

16. A rotary temperature control system for use in a vehicle to control the temperature of air supplied to a passenger compartment in the vehicle, the system comprising:
a manually operable rotary control knob adapted to be disposed in a passenger compartment of an operatively associated vehicle;
a control pulley operatively connected with the control knob for selective rotation thereby;
a vent pulley;
flexible cable means extending from the control pulley to the vent pulley for producing rotary movement of the vent pulley in response to rotary movement of the control pulley;
a rotary output shaft for driving a blend door that controls the output temperature of a blended air stream supplied to the passenger compartment of the vehicle; and,
drive means including non-circular gears providing a drive connection between the vent pulley and the output shaft for producing a predetermined generally non-linear relationship between rotary movement of the control pulley and rotary movement of the output shaft to produce a generally linear relationship between the rotary movement of the control pulley and the temperature of the blended air stream supplied to the passenger compartment of the vehicle throughout a major portion of the rotary movement of the control pulley.

17. The rotary temperature control system according to claim 16 wherein the drive means further includes at least first and second non-circular gears engaged and positioned to transmit rotary movement from the vent pulley to the rotary output shaft.

18. The rotary temperature control system according to claim 17 wherein at least one of said vent pulley and said output shaft is formed integrally with at least one of the first and second non-circular gears.

19. The rotary temperature control system according to claim 18 wherein:
said at least first and second non-circular gears include two non-circular gears carried in a common housing for rotation about separate first and second parallel axes; and,
said output shaft is rotated about a third axis parallel to the first and second parallel axes.

20. The rotary temperature control system according to claim 19 wherein the drive means includes cooperating circular gears driving between the output shaft and at least one of the first and second non-circular gears.

21. For use in a vehicle temperature control system having a vent pulley drivingly rotated from a manually operable rotary control knob in a passenger compartment of the vehicle, a drive assembly for connecting the vent pulley to a blend door that controls the output temperature of a blended air stream supplied to the passenger compartment of the vehicle, said drive assembly comprising:
a rotary output shaft for connection to the blend door;
a housing into which the output shaft extends; and,
drive means in the housing including a first and second interengaged non-circular gears rotatable about spaced first and second parallel axes and providing a drive connection between the vent pulley and the output shaft for producing a predetermined generally linear relationship between the rotary movement of the control pulley and the temperature of the blended air stream supplied to the passenger compartment of the vehicle throughout a major portion of the rotary movement of the control pulley.

22. The drive assembly according to claim 21 wherein at least one of said vent pulley and said output shaft is formed integrally with at least one of said first and second interengaged non-circular gears.

23. The drive assembly according to claim 22 wherein:
said first and second interengaged noncircular gears include two non-circular gears carried in said housing for rotation about separate first and second parallel axes; and,
said output shaft is rotated about a third axis parallel to the first and second parallel axes.

* * * * *